(12) United States Patent
Kuo et al.

(10) Patent No.: US 6,748,014 B1
(45) Date of Patent: Jun. 8, 2004

(54) CORRELATOR/FIR FILTER UNIT FOR DUAL-MODE TRANSCEIVER

(75) Inventors: Fu-Yen Kuo, Hsinchu (TW); Chung-Wei Ku, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/578,732

(22) Filed: May 26, 2000

(51) Int. Cl.[7] .............. H04B 1/69; H04B 1/707; H04B 1/713
(52) U.S. Cl. .............. 375/150; 371/142; 371/143; 371/152; 371/343
(58) Field of Search ................ 375/150, 152, 375/343, 336, 142, 143; 708/300, 319; 342/357.11; 370/441

(56) References Cited

U.S. PATENT DOCUMENTS

| | | | | |
|---|---|---|---|---|
| 5,185,610 A | * | 2/1993 | Ward et al. | 342/357.11 |
| 5,479,363 A | * | 12/1995 | Willson et al. | 708/319 |
| 5,930,292 A | * | 7/1999 | Willis | 375/150 |
| 6,175,848 B1 | * | 1/2001 | Riley | 708/300 |

* cited by examiner

*Primary Examiner*—Stephen Chin
*Assistant Examiner*—Curtis Udom
(74) *Attorney, Agent, or Firm*—Intellectual Property Solutions, Incorporated

(57) ABSTRACT

A Time Division Multiple Access (TDMA) and Code Division Multiple Access (CDMA) transceiver in which correlator banks consisting of an array of dual-code correlators (two tri-code correlators) are used to form correlator filters, such as chip matched filters or multi-code RAKE receivers, or FIR filters for CDMA/TDMA related applications.

10 Claims, 4 Drawing Sheets

CORRELATOR/FIR FILTER UNIT FOR DUAL-MODE TRANSCEIVER

RELATED APPLICATION

This application relates to an application by the same inventors entitled "CORRELATOR FOR CDMA APPLICATION", filed on Feb. 26, 1999, application Ser. No. 09/258,811).

BACKGROUND OF THE INVENTION

1. Field of the Invention

The present invention generally relates to dual-mode transceivers capable of operating in the Code Division Multiple Access (CDMA) or Time Division Multiple Access (TDMA) mode. More particularly, the present invention is directed to CDMA/TDMA transceivers in which CDMA/TDMA filter units, such as chip matched filters, multi-code RAKE receivers or finite impulse response (FIR) filters, are configured using tri-code correlators for CDMA/TDMA related applications.

2. Description of the Related Art

The Global System for Mobile Communication (GSM) system is currently the most widely used cellular standard in the world for supporting voice and short message services. The GSM system is one type of TDMA capable of providing pack-switched high speed data services and high-speed data transmission through General Packet Radio Service (GPRS). However, due to the harmonization of third generation cellular standards/modes (i.e., broadband mobile communications with voice, video, graphics, audio and other information), the GSM/TDMA system will eventually converge with the CDMA system. During this evolution period from the second generation cellular standards/modes to the third generation cellular standards/modes, it is important to develop a suitable CDMA/TDMA dual-mode transceiver that can operate in either CDMA or TDMA mode so that the TDMA and CDMA standards/modes can coexist.

Conventional dual mode receivers or correlators usually use dedicated hardware for each of the two modes, respectively. Even though it is possible that software radios can be used to accommodate TDMA and CDMA standards/modes because software radios migrate the traditional hard-wired radio platforms to flexible software radio platforms for supporting multiple modulation waveforms and multiple air interface standards, currently there is no design for a CDMA/TDMA type of dual-mode transceiver.

SUMMARY OF THE INVENTION

One object of the present invention is to propose a tri-code correlator, which can correlator the input with code 1, −1, or 0 instead of 1 and −1 in order to support multi-code de-spreading or FIR filtering functionality.

It is another object of the present invention to employ tri-code correlators in configuring a chip matched filter or multi-code RAKE receiver for use by a CDMA/TDMA dual-mode transceiver in CDMA related applications, such as chip-rate de-spreading, code acquisition, code tracking, and RAKE combining.

It is a further object of the present invention to employ tri-code correlators in configuring an FIR filter for use by a CDMA/TDMA dual-mode transceiver in TDMA related applications, such as shaping/matched filter or symbol synchronization.

In accordance with the present invention, one or more tri-code correlators can be configured, in terms of software radio systems, as a generic module for use by the CDMA/TDMA dual mode transceiver.

A constructed correlator filter in accordance with the present invention includes a controller for calculating I and Q symbols and dual-code correlator banks connected to the controller for receiving input and correlating I and Q codes. In particular, each dual-code correlator bank is consisted of an array of dual-code correlators (i.e., a pair of tri-code correlators having a common input).

A constructed FIR filter in accordance with the present invention includes a controller for calculating I and Q symbols and dual-code correlator banks connected to the controller for receiving data and processing FIR coefficients in a canonical signed digit (CSD) format. In particular, each dual-code correlator bank is consisted of an array of dual-code correlators (i.e., a pair of tri-code correlators with a common input).

Related aspects and advantages of the invention will become apparent and more readily appreciated from the following detailed description of the invention, taken in conjunction with the accompanying drawings.

DETAILED DESCRIPTION OF THE INVENTION

The present invention will now be described by way of preferred embodiments with references to the accompanying drawings.

Figure 1A:
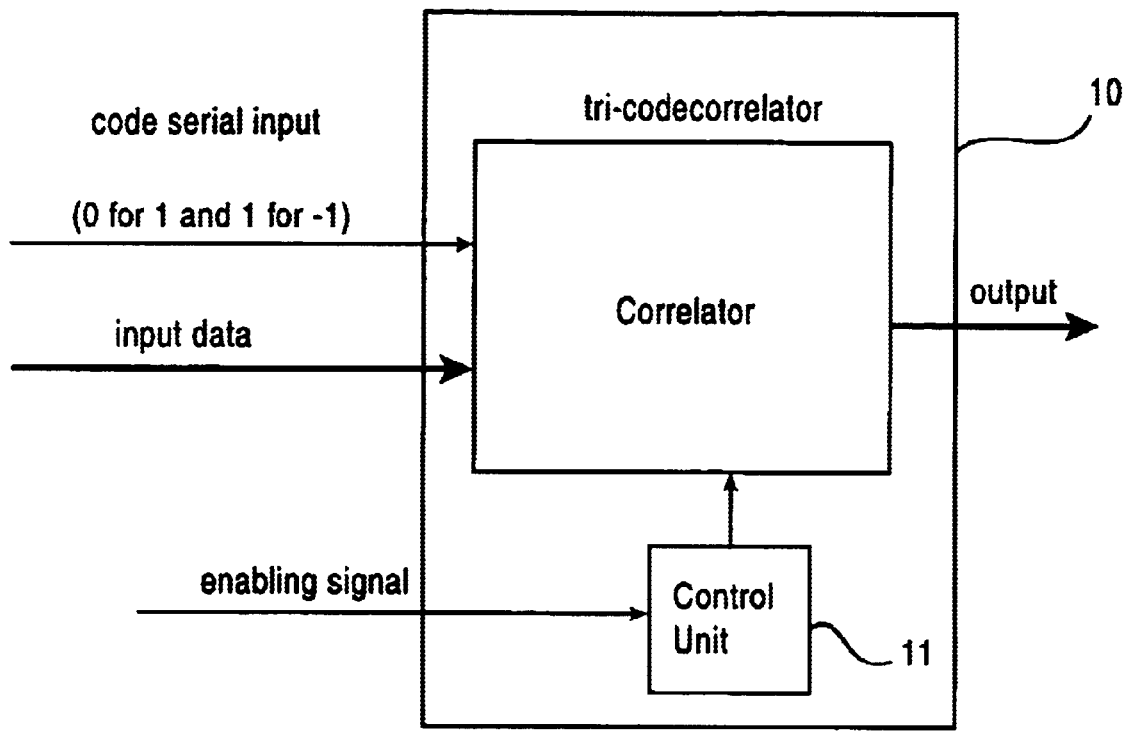
FIG. 1A is a block diagram of a tri-code correlator according to the present invention and FIG. 1B shows one possible implementation of the tri-code correlator.

Instead of correlating the input with 1 or −1 as taught by conventional correlators, a tri-code correlator 10 of the present invention as shown in FIG. 1A correlates the input with 1, −1 or 0. This is accomplished by using a control unit 11 which received an enabling signal to activate/deactivate the correlator for accumulation.

Figure 1B:
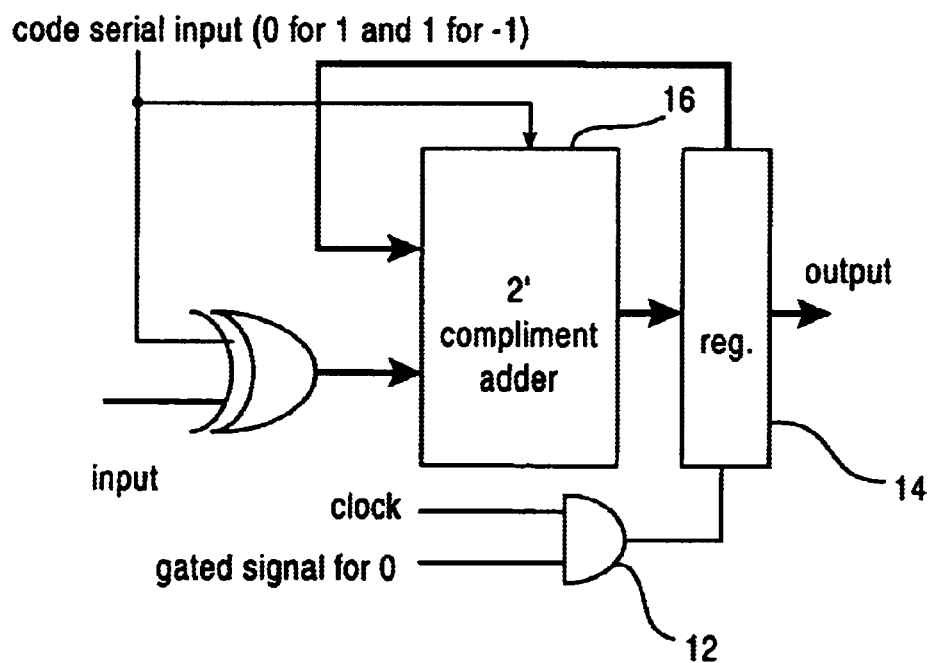

An example of implementation for tri-code correlator is shown in FIG. 1B. This control unit 11 is accomplished by using an AND gate 12 to couple the enabling signal (it could be implemented by a gated signal with a clock signal) and sending an output of the AND gate 12 to a register 14 for accumulation. When the gated signal is set to one (1), the function of the tri-code correlator 10 is the same as that of the conventional correlators. However, when the gated signal is set to zero (0), the register 14 is deactivated and the result is the same as the correlated result of input multiplied by zero.

In the exemplary structure of a correlator as shown in FIG. 1B, a two's (2's) compliment adder 16 is employed for accumulating a code serial input (i.e., 0 for 1 and 1 for −1) as well as the outputs from the register 14 and an XOR gate 18 which receives the input and the code serial inputs. An additional register (not shown) can also be used to receive the signal from the register 14 before an output is obtained.

Figure 2A:
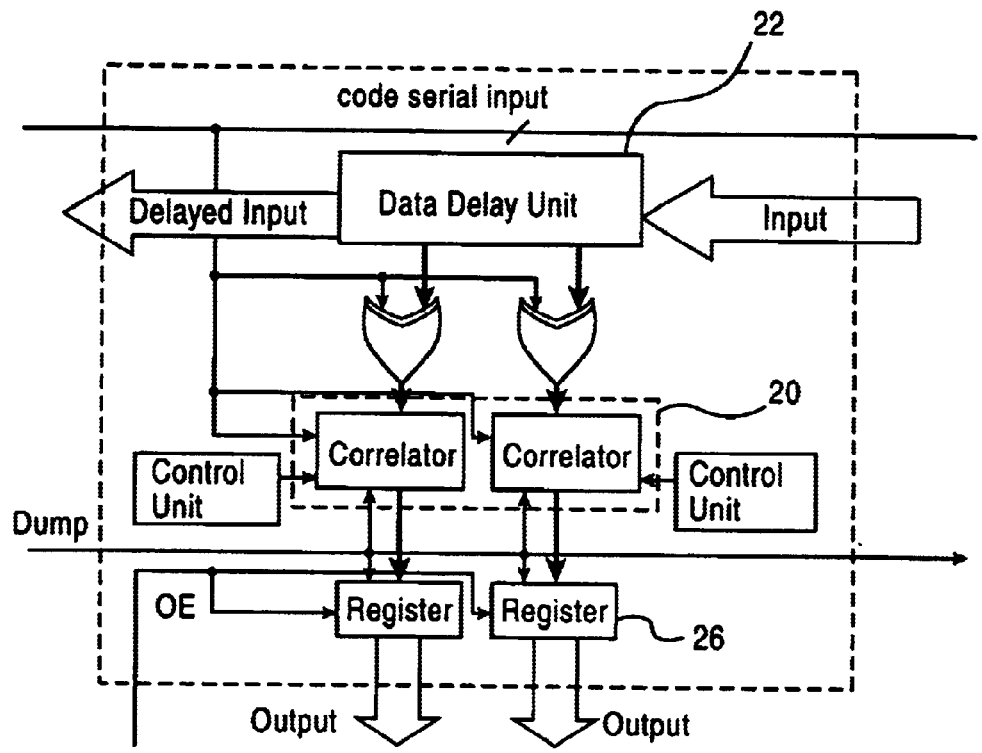
FIGS. 2A and 2B are block diagrams of a dual-code correlator and correlator bank, respectively.

A dual-code correlator 20, which is basically a pair of tri-code correlators 10 having a common input, is shown in FIG. 2A with a data delay unit 22. More specifically, the two tri-code correlators 10 having the same input constitute a dual-code correlator 20 because it can despread input with two Pseudo-Random Noise (PN) codes. As shown in FIG. 2A, such dual-code correlator 20 with the data delay unit 22 allows tri-code correlators 10 to correlate the delayed input with two PN codes concurrently, with results stored in registers 26.

Figure 2B:
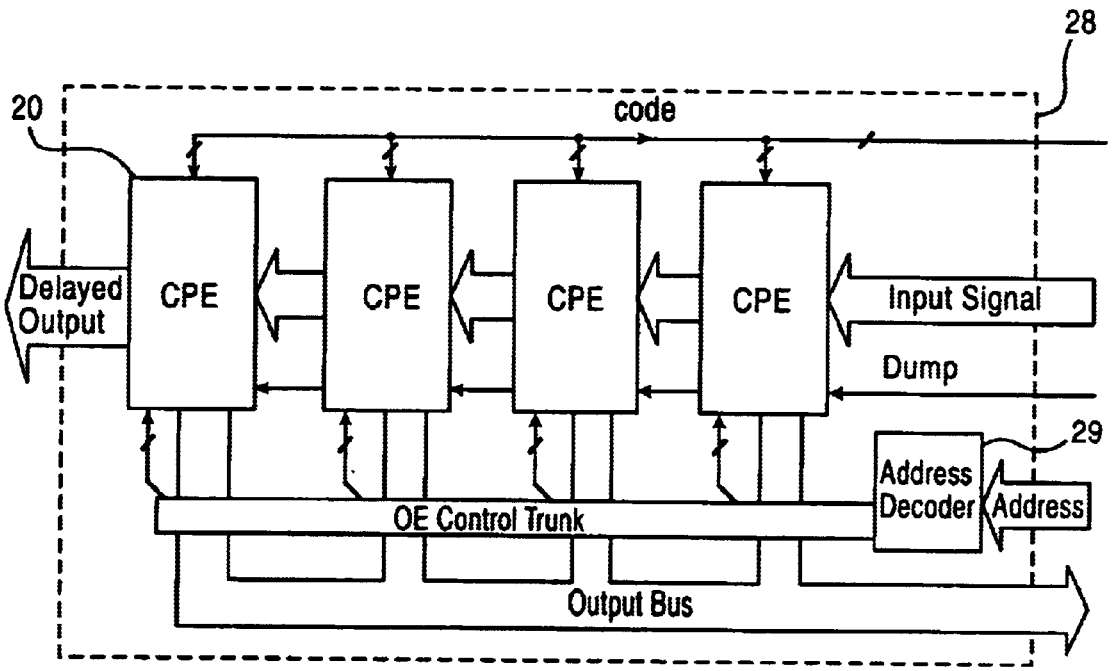

In the present invention, a correlator bank, which is basically a linear array of the dual-code correlators, is configured as a chip matched filter or a correlator array with other correlators for chip-rate processing, such as early-late-gates for code tracking or RAKE combining. FIG. 2B shows an exemplary structure for such correlator bank 28, which includes a linear array of the dual-code correlators (CPE) 20 and an address decoder 29 for decoding the addresses for the correlator bank 28. For a dual-code correlator bank that includes 28 dual-code correlator units, it is designated hereinafter as "128×2 CB".

Figure 3:
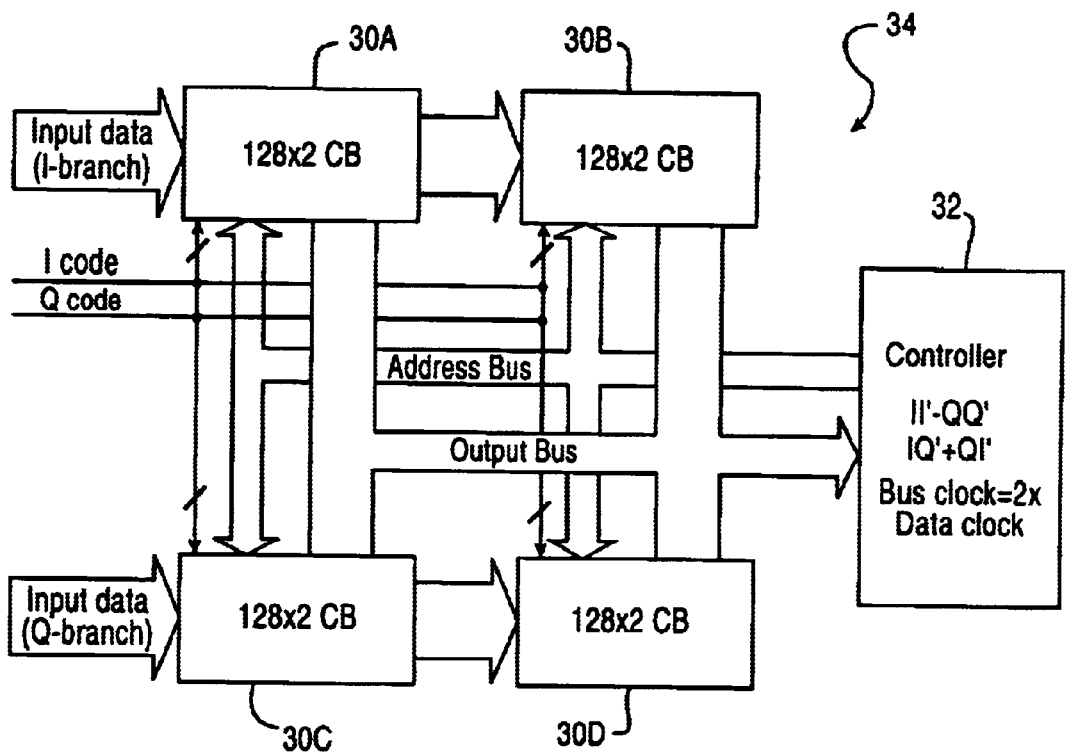
FIG. 3 is block diagram of a 256-tapped chip matched filter according to the present invention.

As shown in FIG. 3, four 128×2 dual-code correlator banks 30A–D with flexible connections and a symbol-rate controller 32 are used to configure a chip matched filter 34 for complex spreading. More specifically, the I branch is fed into the upper banks 30A and 30B, whereby two banks are cascaded as a 256-tapped chip matched filter. In addition, since each bank can correlate its input with two codes, both I and Q codes are correlated with I input. Similarly the Q branch chip matched filter in the lower banks 30C and 30D correlates the Q input with both I and Q codes. The controller 32 communicates with these banks to calculate the I and Q symbols for later symbol-rate processing. The transfer rate of the bus is at least twice of the symbol rate because there are I and Q channels per symbol. Such configuration is useful for code acquisition, especially for real spreading when the available I/Q channels are doubled. However, if the same architecture is used to reduce the 128-tapped chip matched filters to obtain doubled channels, then the window size for code acquisition would be reduced in half to 128 samples.

Figure 4:
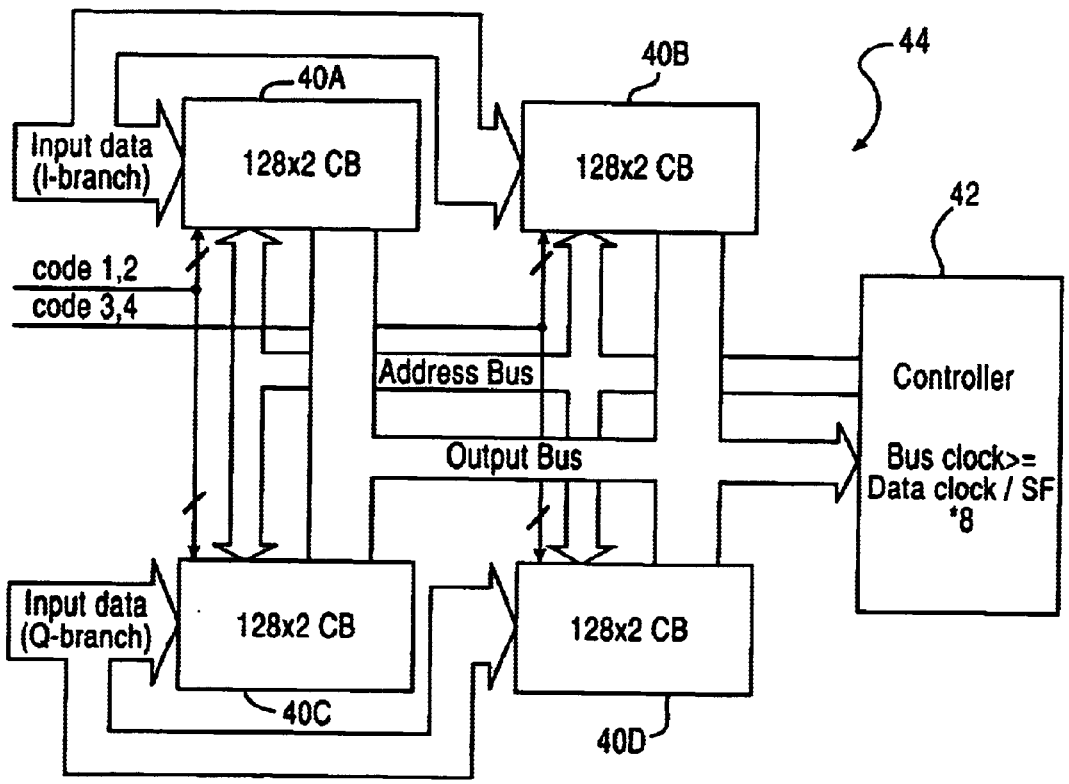
FIG. 4 is a block diagram of a RAKE receiver according to the present invention.

In FIG. 4, four 128×2 dual-code correlator banks 40A–D with flexible connections and a symbol-rate controller 42 are used to configure a RAKE receiver 44 for four PN codes with real spreading. Each of the correlator banks 40A–D receives I and Q data and correlates the inputs with their corresponding PN code. Basically the upper two banks are designed for I channel and the lower two banks for Q channel. For RAKE combining, symbols with several specified delays are summed together according to the corresponding weightings. Since each correlator bank consists of 128 correlators, the window size of the maximal delay spread is 128 samples (32 chips for four times oversampling). The controller 42 specified the delays for each finger so that each correlator bank 40 can put its finger outputs into the bus. The accumulators in each of the correlator banks 40A–D are deactivated if they are not used for the specified delay. As a result, each correlator bank can get finger outputs for one channel with two PN codes. The total configuration can correlate I and Q channels with four PN codes concurrently. The de-spread outputs are combined by the controller 42. Since the RAKE combining process is in the symbol-rate, the transfer rate is affordable for the address and data buses to communicate between the controller 42 and the correlator banks 40A–D. However, since there are 8 outputs per symbol from the correlator banks 40A–D, the bus speed is at least 8 times the symbol rate if the memory interface can output data into the bus in one clock cycle. Of course, the same configuration can also be used for complex spreading, but the affordable PN code numbers would be two instead of four.

Figure 5:
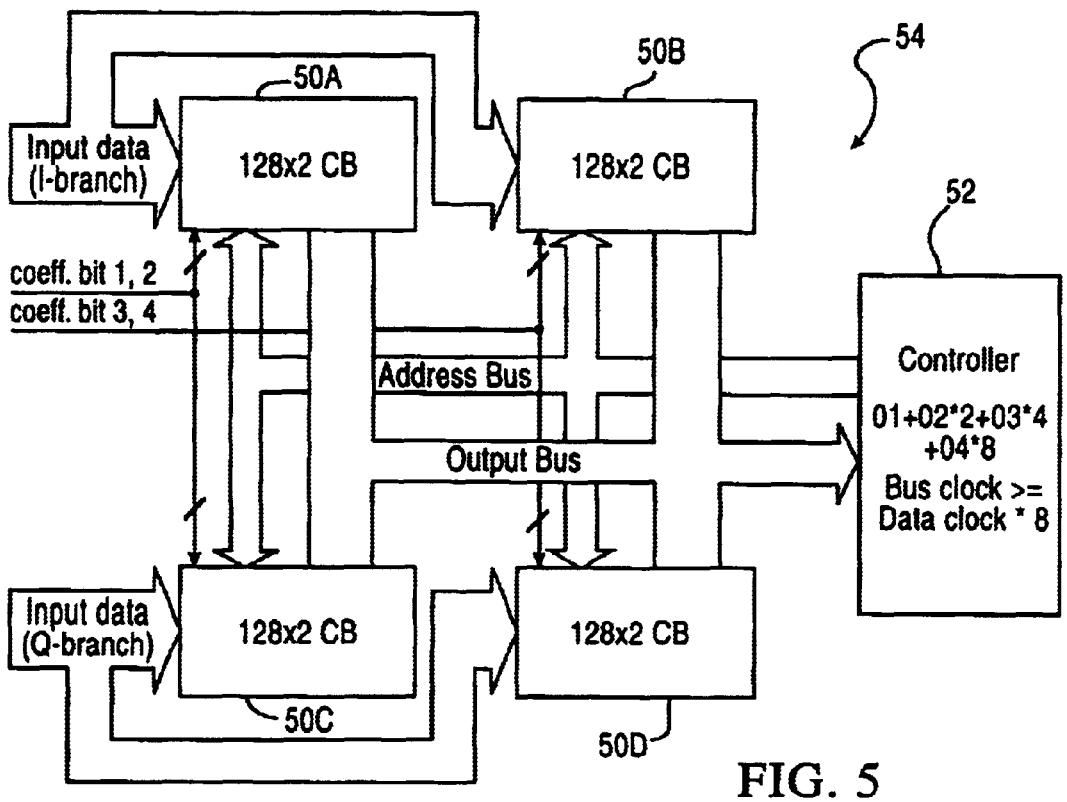
FIG. 5 is a block diagram of an FIR filter according to the present invention.

In FIG. 5, four 128×2 dual-code correlator banks 50A–D with flexible connections and a symbol-rate controller 52 are used to configure an FIR filter 54 for FIR filtering of I channel in the upper correlator banks 50A and 50B, and FIR filtering of Q channel in the lower correlator banks 50C and 50D. The 4-bit FIR coefficients are separated into 4 digits as the code inputs. Since each correlator bank can correlator two PN codes, the two least significant bits (LSBs) of the CSD digits are sent into the left correlator banks 50A and 50C, and the two most significant bits (MSBs) of the CSD digits are sent into the right correlator banks 50B and 50D. In this way, a 128-tapped FIR filter can be implemented with 4-bit coefficients.

To accomplish this, the FIR filter coefficients are converted into the canonical signed digit (CSD) format. That is, the representation of the coefficients becomes the binary weighted sum of 1, −1 and 0 instead of binary weighted sum of 0 and 1. For example, the decimal number 7 is represented as 0111 in binary base, or 000$\bar{1}$ for CSD representation where $\bar{1}$ means −1. The result is seven (i.e., 8−1=7), which is the same as the original number but with decrease in the total number of non-zero digits. The above translation is a useful technique for the FIR filter design to reduce both silicon area and power consumption of the filter. As to the FIR coefficients, which include 4 digits, they are converted into a CSD format and used for FIR filtering in both I and Q channels.

Figure 6:
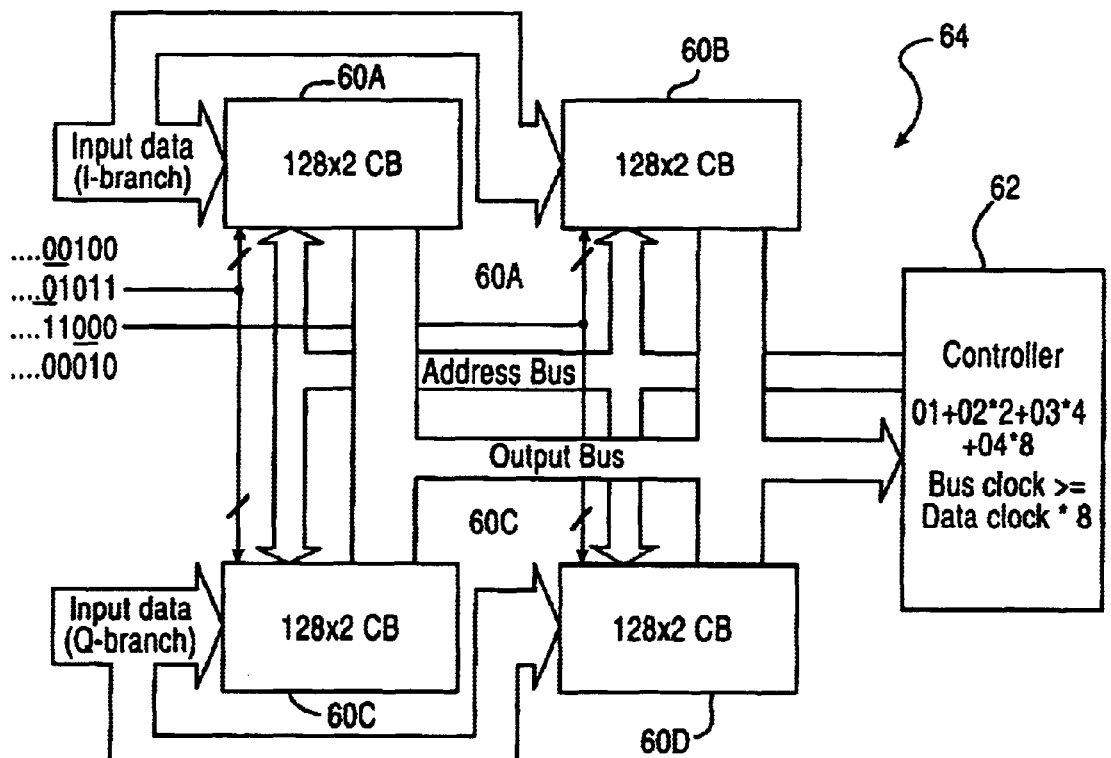
FIG. 6 is block diagram illustrating an exemplary operation of the FIR filter of FIG. 5.

In order to explain the above idea more clearly, an illustrative operation is shown in FIG. 6. Suppose the FIR coefficients are: +1, −3, +2, +7, −8, . . . , etc. These coefficients are converted into the CSD format as 0001, 010$\bar{1}$, 0010,100$\bar{1}$,1000, . . . , etc. As a result, these digits are sent into the correlator banks 60A–D according to the sequence of the FIR coefficients for the code input as shown in FIG. 6. After 128 clocks, the FIR coefficients are again sent to the correlator banks from the first coefficient. The dynamic range of the 4-digits CSD ranges from +15 to −15. A final controller 64 collects all the outputs of the correlator banks 60A–D and calculates the weighted sum to obtain the correct filter outputs. Since there are 8 outputs per sample (I and Q channels and each channel with 4 CSD digits coefficients), the transfer rate of the bus is at least 8 times the sample rate.

Although a specific form of the present invention has been described above and illustrated in the accompanying drawings in order to be more clearly understood, the above description is made by way of example and not as a limitation to the scope of the present invention. It is believed that various modifications apparent to one of ordinary skill in the art could be made without departing from the scope of the present invention which is to be determined by the following claims.

What is claimed is:

1. A chip matched filter for a dual-mode transceiver comprising:

a controller for calculating I and Q symbols;

a plurality of upper dual-code correlator banks connected to said controller for receiving an input from an I-branch and correlating I and Q codes; and a plurality of lower dual-code correlator banks connected to said controller for receiving an input from a Q-branch and correlating I and Q codes, wherein each of said upper and lower dual-code correlator banks includes a plurality of dual-code correlators, wherein each of said dual-code correlators further comprises:

a data delay unit for delaying said input corresponding to said I-branch or said Q-branch;

a pair of accumulators for correlating said delayed input from said data delay unit and a pair of code serial inputs; and a plurality of registers for storing data from said accumulators.

2. A chip matched filter for a dual-mode transceiver comprising:
 a controller for calculating I and Q symbols;
 a plurality of upper dual-code correlator banks connected to said controller for receiving an input from an I-branch and correlating I and Q codes; and
 a plurality of lower dual-code correlator banks connected to said controller for receiving an input from a Q-branch and correlating I and Q codes, wherein each of said upper and lower dual-code correlator banks includes a plurality of dual-code correlators, wherein each of said dual-code correlators includes a pair of tri-code correlators having a common input.

3. A RAKE receiver for a dual-mode transceiver comprising:
 a controller for calculating I and Q symbols;
 a plurality of upper dual-code correlator banks connected to said controller for receiving input from an I-branch and correlating I and Q channels with four PN codes; and
 a plurality of lower dual-code correlator banks connected to said controller for receiving input from a Q-branch and correlating I and Q channels with four PN codes, wherein each of said upper and lower dual-code correlator banks includes a plurality of dual-code correlators,
 wherein each of said upper and lower dual-code correlator banks further comprises:
  a linear array of said dual-code correlators; and
  an address decoder for addressing said array of dual-code correlators,
 and wherein each of said dual-code correlators further comprises:
  a data delay unit for delaying said input corresponding to said I-branch or said Q-branch;
  a pair of accumulators for correlating said delayed input from said data delay unit and a pair of code serial inputs; and
  a plurality of registers for storing data from said accumulators.

4. A RAKE receiver for a dual-mode transceiver comprising:
 a controller for calculating I and Q symbols;
 a plurality of upper dual-code correlator banks connected to said controller for receiving input from an I-branch and correlating I and Q channels with four PN codes; and
 a plurality of lower dual-code correlator banks connected to said controller for receiving input from a Q-branch and correlating I and Q channels with four PN codes, wherein each of said upper and lower dual-code correlator banks includes a plurality of dual-code correlators,
 wherein each of said dual-code correlators includes a pair of tri-code correlators having a common input.

5. A finite-impulse response (FIR) filter for a dual-mode transceiver comprising:
 a controller for calculating I and Q symbols;
 a pair of upper dual-code correlator banks connected to said controller for receiving data from an I-branch and processing FIR coefficients in a canonical signed digit (CSD) format; and
 a pair of lower dual-code correlator banks connected to said controller for receiving data from a Q-branch and processing said FIR coefficients in said CSD format, wherein each of said upper and lower dual-code correlator banks includes an array of dual-code correlators, and
 wherein each of said dual-code correlators further comprises:
  a data delay unit for delaying said input;
  a pair of accumulators for correlating said delayed input from said data delay unit and said FIR coefficients; and
  a plurality of registers for storing data from said accumulators.

6. A finite-impulse response (FIR) filter for a dual-mode transceiver comprising:
 a controller for calculating I and Q symbols;
 a pair of upper dual-code correlator banks connected to said controller for receiving data from an I-branch and processing FIR coefficients in a canonical signed digit (CSD) format; and
 a pair of lower dual-code correlator banks connected to said controller for receiving data from a Q-branch and processing said FIR coefficients in said CSD format, wherein each of said upper and lower dual-code correlator banks includes an array of dual-code correlators, and
 wherein each of said dual-code correlators includes a pair of tri-code correlators having a common input.

7. A method for processing a signal through a finite-impulse response (FIR) filter comprising the steps of:
 calculating I and Q symbols using a controller; and
 processing FIR coefficients in a canonical signed digit (CSD) format using pairs of left and right dual-code correlator banks connected to said controller, and
 wherein two least significant bits (LSBS) of said FIR coefficients in CSD format are sent to said pair of left dual-code correlators, and two most significant bits (MSBs) of said FIR coefficients in CSD format are sent to said pair of right dual-code correlators.

8. A tri-code correlator, comprising:
 a correlator, receiving an input and a code serial input for accumulation; and
 a control unit, receiving an enabling signal, for activating or deactivating said correlator for accumulation, wherein said correlator comprises:
  an XOR gate for processing said input and said the code serial input; and
  a two's compliment adder for accumulating said code serial input, an output of said XOR gate and an output of an register, and sending an output of a two's compliment adder to an input of said register which couple to said control unit for accumulation.

9. A tri-code correlator, comprising:
 a correlator, receiving an input and a code serial input for accumulation; and
 a control unit, receiving an enabling signal, for activating or deactivating said correlator for accumulation, wherein said control unit further comprises:
  an AND gate, receiving said enabling signal, for activating or deactivating said correlator for accumulation.

10. The tri-code correlator of claim 9 wherein said enabling signal further comprises a gated signal with a clock signal.

* * * * *